(12) United States Patent
Tatsushima et al.

(10) Patent No.: US 12,203,596 B2
(45) Date of Patent: Jan. 21, 2025

(54) HIGH-PRESSURE TANK AND METHOD FOR MANUFACTURING HIGH-PRESSURE TANK

(71) Applicant: HONDA MOTOR CO., LTD., Tokyo (JP)

(72) Inventors: Kosuke Tatsushima, Wako (JP); Yuki Nishitarumizu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/668,508

(22) Filed: Feb. 10, 2022

(65) Prior Publication Data

US 2022/0299162 A1    Sep. 22, 2022

(30) Foreign Application Priority Data

Mar. 19, 2021 (JP) ................. 2021-045739

(51) Int. Cl.
*F17C 1/06* (2006.01)
*B29C 70/32* (2006.01)
*B29L 31/00* (2006.01)

(52) U.S. Cl.
CPC ............... *F17C 1/06* (2013.01); *B29C 70/32* (2013.01); *B29L 2031/7156* (2013.01); *F17C 2201/0109* (2013.01); *F17C 2203/012* (2013.01); *F17C 2203/0604* (2013.01); *F17C 2203/066* (2013.01); *F17C 2203/0668* (2013.01);
(Continued)

(58) Field of Classification Search
CPC ............... F17C 1/06; F17C 2201/0109; F17C 2203/012; F17C 2203/0604; F17C 2203/066; F17C 2203/0668; F17C 2209/232; F17C 2203/067; F17C 2205/03; F17C 2205/0305; F17C 2209/2154;
(Continued)

(56) References Cited

U.S. PATENT DOCUMENTS 3,047,191 A * 7/1962 Young ............... B64D 37/06
156/169
3,282,757 A * 11/1966 Brussee ............ B29C 70/086
156/172

(Continued)

FOREIGN PATENT DOCUMENTS

CN    102388255 A    3/2012
CN    110173618 A    8/2019
(Continued)

OTHER PUBLICATIONS

Office Action dated Jul. 20, 2023 issued over the corresponding Chinese Patent Application No. 202210205976.7 with the English machine translation thereof.
(Continued)

*Primary Examiner* — Nathan J Jenness
*Assistant Examiner* — Laura E. Parker
(74) *Attorney, Agent, or Firm* — Carrier, Shende & Associates P.C.; Joseph P. Carrier; Jeffrey T. Gedeon

(57) ABSTRACT

A high-pressure tank is provided with a liner made of resin, a reinforcing layer including a plurality of fiber layers formed by winding fiber a plurality of times around the outer surface of the liner, and a cap fixed to the axial end portion of the liner and including a supply and discharge hole that supplies and discharges fluid to and from the liner. A starting end, which is a start of winding of the fiber, is disposed overlapping the cap.

8 Claims, 8 Drawing Sheets

(52) U.S. Cl.
CPC .. *F17C 2209/232* (2013.01); *F17C 2221/012* (2013.01); *F17C 2270/0168* (2013.01)

(58) Field of Classification Search
CPC .......... F17C 2209/2163; F17C 2209/23; F17C 2209/234; B29C 70/32; B29C 70/30; B29C 70/543
USPC ....................................................... 220/582
See application file for complete search history.

(56) References Cited

U.S. PATENT DOCUMENTS

| | | | | |
|---|---|---|---|---|
| 5,287,988 | A | * 2/1994 | Murray | F17C 1/16 220/589 |
| 2004/0026431 | A1 | * 2/2004 | Jones | F17C 1/06 220/588 |
| 2005/0076995 | A1 | * 4/2005 | Yasui | F17C 1/06 156/172 |
| 2008/0251520 | A1 | * 10/2008 | Ota | F17C 1/16 220/586 |
| 2012/0024745 | A1 | 2/2012 | Otsuka et al. | |
| 2012/0024746 | A1 | * 2/2012 | Otsubo | F17C 13/06 156/187 |
| 2012/0037745 | A1 | * 2/2012 | Aiyama | B29C 53/605 242/430 |
| 2013/0306783 | A1 | * 11/2013 | Tanigawa | B65H 57/00 242/476.7 |
| 2019/0257473 | A1 | * 8/2019 | Kanezaki | F17C 1/02 |
| 2019/0277447 | A1 | * 9/2019 | Rocher | B29C 53/56 |
| 2019/0285227 | A1 | 9/2019 | Veenstra et al. | |
| 2019/0390821 | A1 | * 12/2019 | Katano | B29C 70/86 |
| 2020/0141538 | A1 | 5/2020 | Umetsu | |
| 2020/0363012 | A1 | 11/2020 | Watanabe | |
| 2022/0065399 | A1 | * 3/2022 | Lambourne | F17C 13/04 |

FOREIGN PATENT DOCUMENTS

| | | | | |
|---|---|---|---|---|
| CN | 111947017 A | | 11/2020 | |
| EP | 2532507 A2 | * | 12/2012 | .......... B29C 53/602 |
| FR | 2923575 A1 | * | 5/2009 | .......... B29C 53/602 |
| JP | 2009-168111 A | | 7/2009 | |
| JP | 2010-249147 A | | 11/2010 | |
| JP | 2014-080999 A | | 5/2014 | |
| JP | 2020-070907 A | | 5/2020 | |
| JP | 2020-175564 A | | 10/2020 | |
| WO | WO-2013083152 A1 | * | 6/2013 | ................ F17C 1/06 |

OTHER PUBLICATIONS

Office Action dated Aug. 13, 2024 issued in the corresponding Japanese Patent Application No. 2021-045739 with the English machine translation thereof.

Office Action dated Jun. 7, 2024 issued in the corresponding Chinese Patent Application No. 202210205976.7 with the English machine translation thereof.

* cited by examiner

HIGH-PRESSURE TANK AND METHOD FOR MANUFACTURING HIGH-PRESSURE TANK

CROSS-REFERENCE TO RELATED APPLICATIONS

This application is based upon and claims the benefit of priority from Japanese Patent Application No. 2021-045739 filed on Mar. 19, 2021, the contents of which are incorporated herein by reference.

BACKGROUND OF THE INVENTION

Field of the Invention

The present invention relates to a high-pressure tank provided with a reinforcing layer covering the outer surface of a liner, and a method for manufacturing the same.

Description of the Related Art

A high-pressure tank is widely used as a container for containing fluid such as gas and liquid. For example, the high-pressure tank is mounted in a fuel cell vehicle to contain hydrogen gas supplied to a fuel cell system.

As a high-pressure tank of this type, there is known a high-pressure tank including a liner made of a resin for containing fluid in a hollow interior and a reinforcing layer made of a fiber-reinforced resin for covering the outer surface of the liner in order to reinforce the liner (see, for example, JP 2010-249147 A). The reinforcing layer is generally formed by a process called filament winding. In filament winding, resin-impregnated reinforced fiber (FRP) is wound around the outer wall of the liner multiple times, and then the resin is cured by heating.

SUMMARY OF THE INVENTION

According to the prior art, in filament winding, a level difference is created between the liner and the fiber end (starting end) at which the fiber begins to be wound relative to the liner. A shear force caused by the level difference acts on the fibers overlapping the level difference (fibers in the innermost layer of the reinforcing layer), and cracks are generated in the fibers of the innermost layer. When the resin liner is pushed into the cracks of the fibers by the internal pressure of the high-pressure tank, the liner breaks at the place where it is pushed. Therefore, the durability of the high-pressure tank may be reduced.

An object of the present invention is to solve the aforementioned problem.

A first aspect of the present invention is a high-pressure tank provided with a liner made of resin, a reinforcing layer including a plurality of fiber layers formed by winding fiber a plurality of times around the outer surface of the liner, and a cap fixed to an axial end portion of the liner and including a supply and discharge hole configured to supply and discharge fluid to and from the liner, wherein a starting end, which is the start of winding the fiber, is disposed overlapping the cap.

According to a second aspect of the present invention, there is provided a method for manufacturing a high-pressure tank, including: an assembly providing step of providing an assembly including a cap that is fixed to an axial end portion of a liner made of resin wherein the cap is formed with a supply and discharge hole configured to supply and discharge fluid to and from the liner; and a reinforcing layer forming step of forming a reinforcing layer from a plurality of fiber layers by winding fiber a plurality of times around the outer surface of the liner of the assembly, wherein in the reinforcing layer forming step, a starting end, which is the start of winding of the fiber, is disposed overlapping the cap.

According to the present invention, the starting end, which is the start of winding of fibers constituting the reinforcing layer, is disposed so as to overlap the cap. Therefore, even if cracks (damage) occur in the innermost layer of the reinforcing layer due to a level difference created by the starting end, the liner is not damaged. Therefore, it is possible to extend the life of the liner by preventing the liner from being damaged due to cracks of the fiber.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Figure 1:
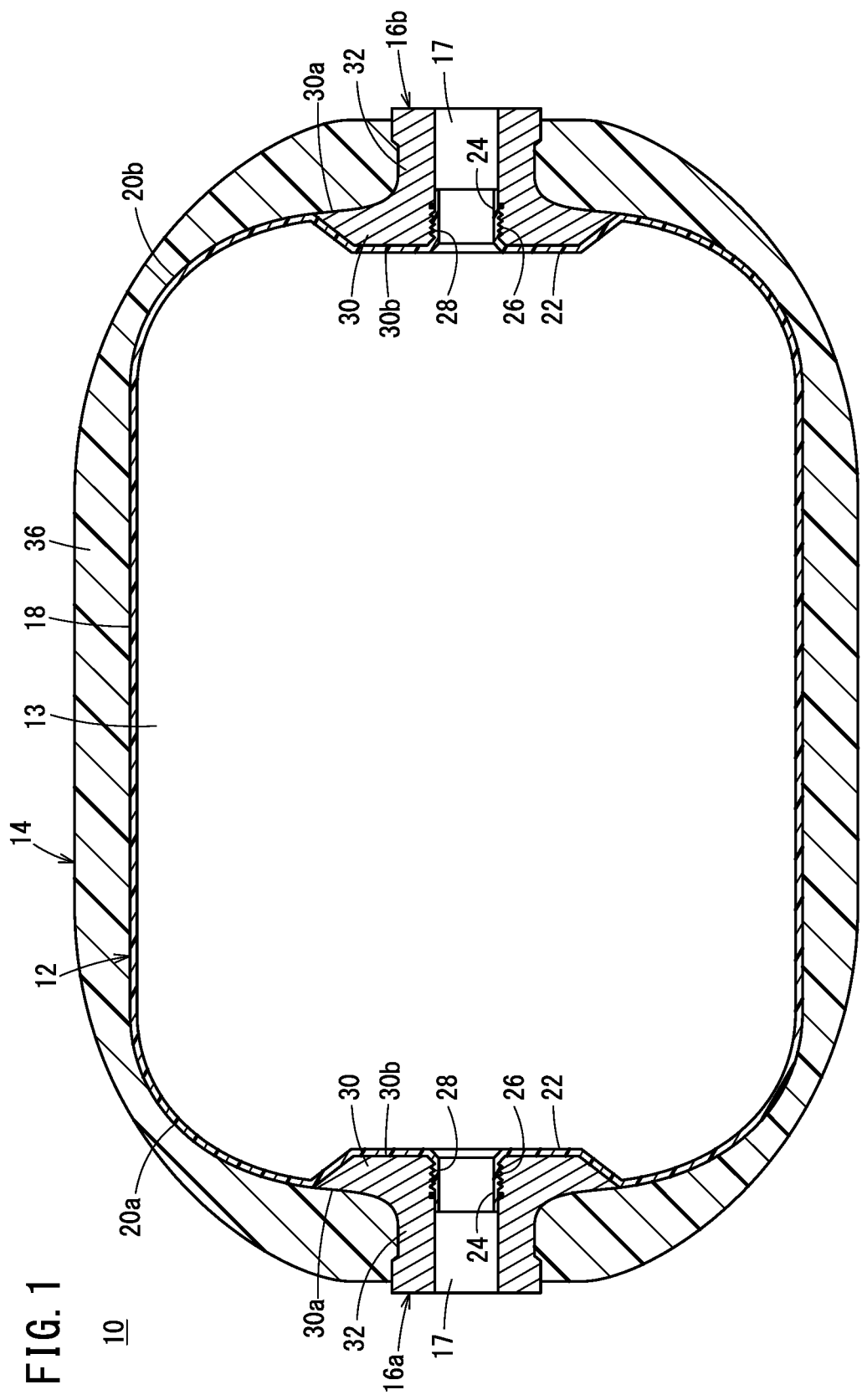
FIG. 1 is a cross-sectional view taken along an axial direction of a high-pressure tank according to an embodiment of the present invention.

A high-pressure tank 10 according to the present embodiment shown in FIG. 1 is, for example, a fuel tank (hydrogen tank) mounted in a fuel cell vehicle. In a case where the high-pressure tank 10 is mounted in the fuel cell vehicle, the high-pressure tank 10 is filled with hydrogen gas at a high pressure. The hydrogen gas is supplied to the anode of a fuel cell (or fuel cell stack) mounted in the fuel cell vehicle.

The high-pressure tank 10 may be a tank applied to an entity other than the fuel cell vehicle. The high-pressure tank 10 may be a fuel gas tank for storing fuel gas other than hydrogen gas. The high-pressure tank 10 may be a gas tank used in a facility for filling a fuel gas tank with fuel gas other than hydrogen gas. The high-pressure tank 10 may be a gas tank used for transporting fuel gas other than hydrogen gas. The high-pressure tank 10 may be a tank for storing compressed natural gas or liquefied petroleum gas.

The high-pressure tank 10 is equipped with a liner 12 in which a fluid storage chamber 13 (filling chamber) is formed, a reinforcing layer 14 covering the liner 12, and caps 16a, 16b fixed to both ends of the liner 12.

The liner 12 is made of, for example, high-density polyethylene (HDPE) resin that exhibits hydrogen barrier properties. In this case, since the HDPE resin is inexpensive and easy to process, there is an advantage that the liner 12 can be easily produced at low cost. Further, since the HDPE resin is excellent in strength and rigidity, it is suitable for the liner 12 of the high-pressure tank 10.

The liner 12 has a hollow trunk 18 that has a substantially cylindrical shape, and a first dome portion 20a and a second dome portion 20b that are provided at both ends of the trunk 18, also called converging portions, which gradually converge. In this embodiment, the inner diameter and the outer diameter of the trunk 18 are substantially constant. The inner diameter and the outer diameter of the trunk 18 may be tapered toward the first dome portion 20a or the second dome portion 20b. The inner diameter and the outer diameter of the trunk 18 may be increased in diameter toward the first dome portion 20a or the second dome portion 20b. The first dome portion 20a and the second dome portion 20b constitute both axial ends of the liner 12.

Each of the inner peripheral portions of the first dome portion 20a and the second dome portion 20b is provided with an annular concave portion 22 dented inward in the axial direction of the liner 12. A cylindrical convex portion 24 protruding outward in the axial direction of the liner 12 is provided in a central portion of the annular concave portion 22. A male screw 26 is provided on the outer peripheral portion of the cylindrical convex portion 24. A female screw 28 provided in the inner peripheral portion of each of the caps 16a and 16b is screwed into the male screw 26 of the cylindrical convex portion 24. As a result, each of the caps 16a and 16b is fixed to the liner 12.

The caps 16a and 16b are cylindrical members formed with supply and discharge holes 17 for supplying and discharging fluid to and from the liner 12, and are made of, for example, metal. Since one cap 16a and the other cap 16b have the same configuration as each other, the configuration of one cap 16a will be representatively described below. The other cap 16b may be not provided.

The female screw 28 is provided at the inner peripheral portion of the cap 16a. The female screw 28 of the cap 16a is screwed into the male screw 26 of the cylindrical convex portion 24. Thus, the cap 16a is fixed to the liner 12. The cap 16a has an annular flange section 30 interposed between the liner 12 and the reinforcing layer 14, and a cylindrical tube portion 32 being integrally continuous with the flange portion 30 and having a diameter smaller than that of the flange portion 30.

The flange portion 30 is disposed on the annular concave portion 22 of the liner 12. A back surface 30b of the flange portion 30 (a surface close to the storage chamber 13) contacts the liner 12 (specifically, the annular concave portion 22). A front surface 30a of the flange portion 30 (a surface facing away from the storage chamber 13) abuts against the reinforcing layer 14. The cylindrical tube portion 32 protrudes from the flange portion 30 outward in the axial direction of the liner 12. The distal end of the tube portion 32 is exposed from the reinforcing layer 14.

A pipe (not shown) for supplying hydrogen gas to the anode or for supplying hydrogen gas from a hydrogen supply source is connected to the cap 16a.

The reinforcing layer 14 is formed of a fiber-reinforced resin (FRP), which is reinforcing fibers impregnated with a resin base material. The reinforcing layer 14 is a stack body formed as described below. Impregnated fibers 36 (filament) impregnated with resin is wound a plurality of times by filament winding. Thereafter, the resin is cured by heating, for example. In this way, the reinforcing layer 14 is formed. Examples of FRP include CFRP, GFRP, and the like. Hereinafter, the impregnated fibers 36 is simply referred to as "fiber 36".

Figure 2:
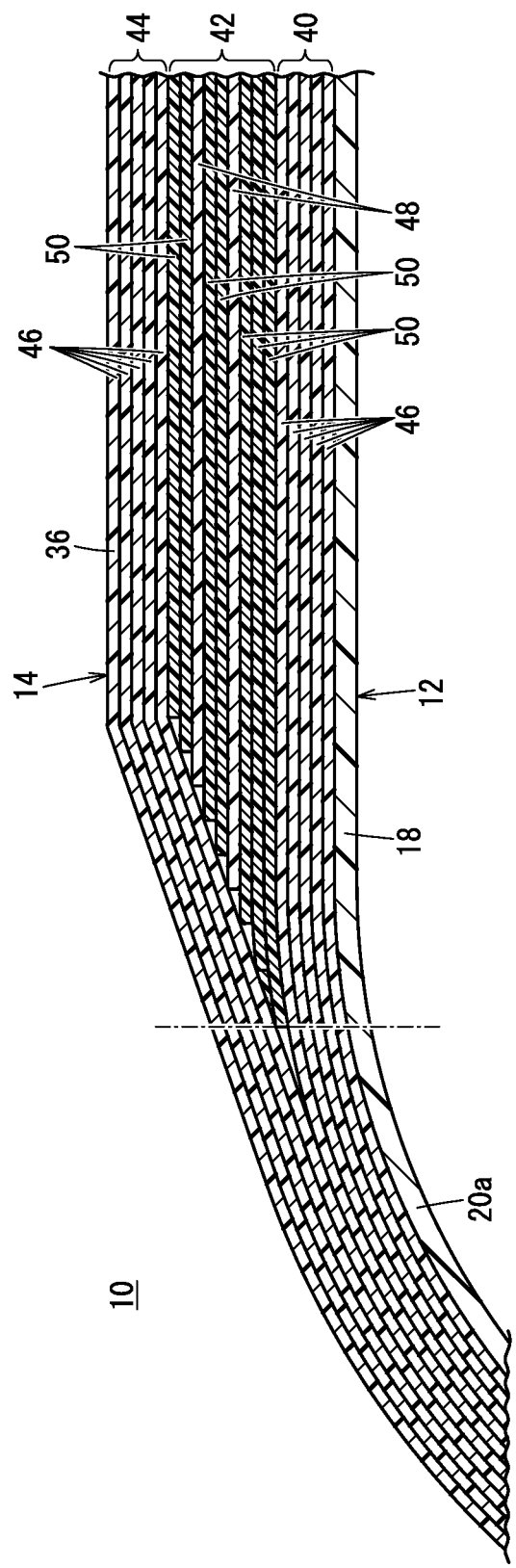
FIG. 2 is an enlarged cross-sectional view of the liner and a reinforcing layer of the high pressure tank shown in FIG. 1.

As shown in FIG. 2, the reinforcing layer 14 has an inner stack portion 40 that is an inner peripheral portion including the start of winding of the fiber 36, an outer stack portion 44 that is an outer peripheral portion including the end of winding of the fiber 36, and an intermediate stack portion 42 that is interposed between the inner stack portion 40 and the outer stack portion 44. In FIG. 2, a dot-and-dash line indicates a boundary between the first dome portion 20a and the trunk 18.

The inner stack portion 40 is a stack body formed by stacking a plurality of low-angle helical layers 46 formed by low-angle helical winding of the fiber 36. Therefore, in the high-pressure tank 10, the innermost layer of the reinforcing layer 14 made up from a plurality of fiber layers is the low-angle helical layer 46. Similarly, the outer stack portion 44 is a stack body formed by stacking a plurality of low-angle helical layers 46 formed by low-angle helical winding of the fiber 36.

Figure 3:
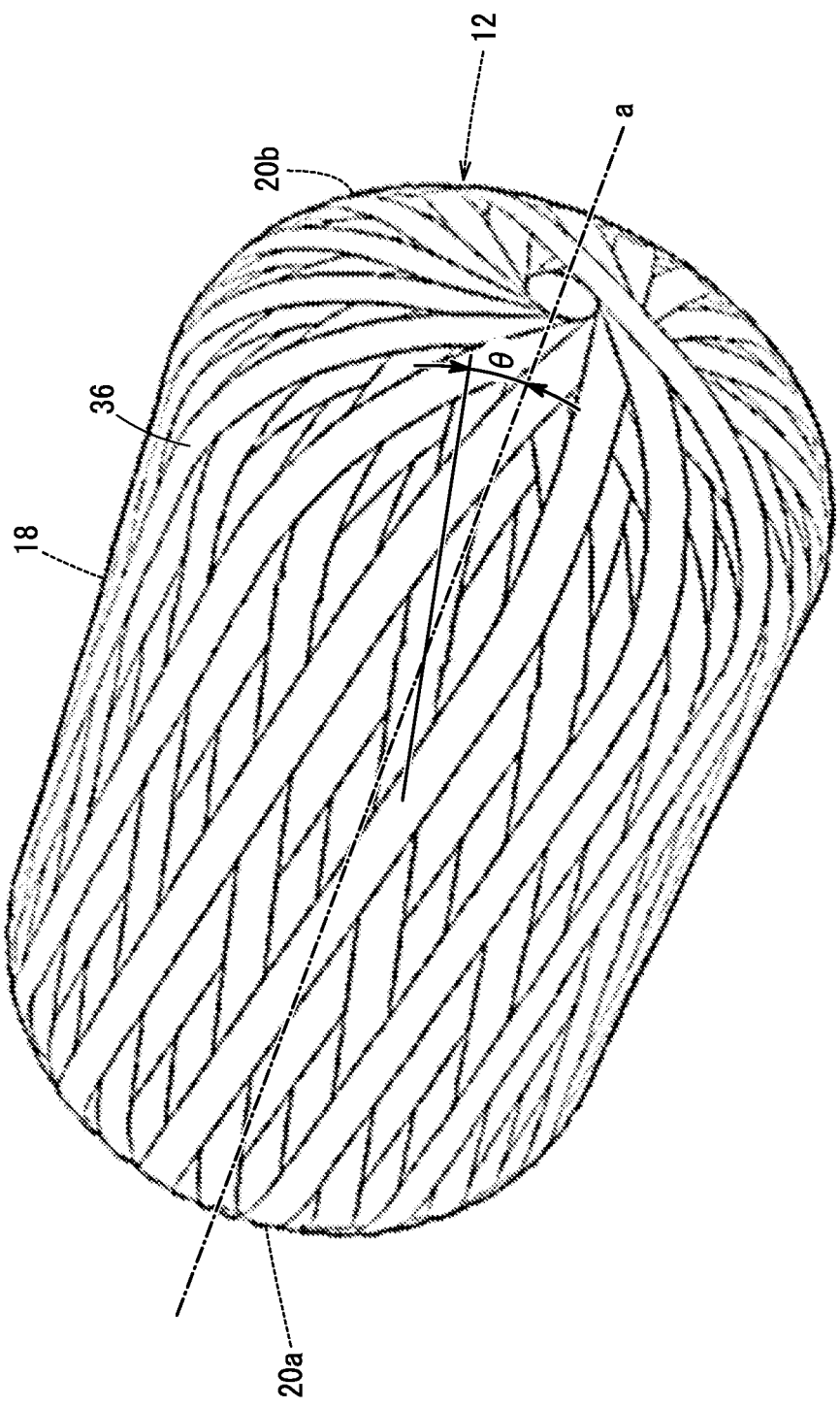
FIG. 3 is a perspective view for explaining a helical winding.

The helical winding is, as shown in FIG. 3, to wind the fiber 36 in such a way that the extending direction thereof is inclined at a predetermined inclination angle θ with respect to the longitudinal direction (axis line a) of the trunk 18 of the liner 12. As used herein, "low-angle helical winding" refers to a case where the inclination angle θ is about 40° or less. FIG. 3 illustrates a case where the inclination angle θ is about 10°. The term "high-helical winding" as used herein refers to a case where the inclination angle exceeds about 40°.

In FIG. 2, the intermediate stack portion 42 includes a hoop layer 50 formed by hoop-winding the impregnated fiber 36 and a high-helical layer 48 formed by high-helical winding. The intermediate stack portion 42 is a mixed stack body formed of the hoop layer 50 and the high-helical layer 48. The hoop layer 50 and the high-helical layer 48 are stacked alternately. The hoop winding is a winding method in which the fiber 36 is wound so that the extending direction thereof is substantially orthogonal to the longitudinal direction of the trunk 18 of the liner 12. The intermediate stack portion 42, particularly the hoop layer 50, ensures the pressure resistance strength of the trunk 18. The intermediate stack portion 42 may be formed only of a plurality of hoop layers 50. That is, the high-helical layer 48 may be not provided.

Figure 4:
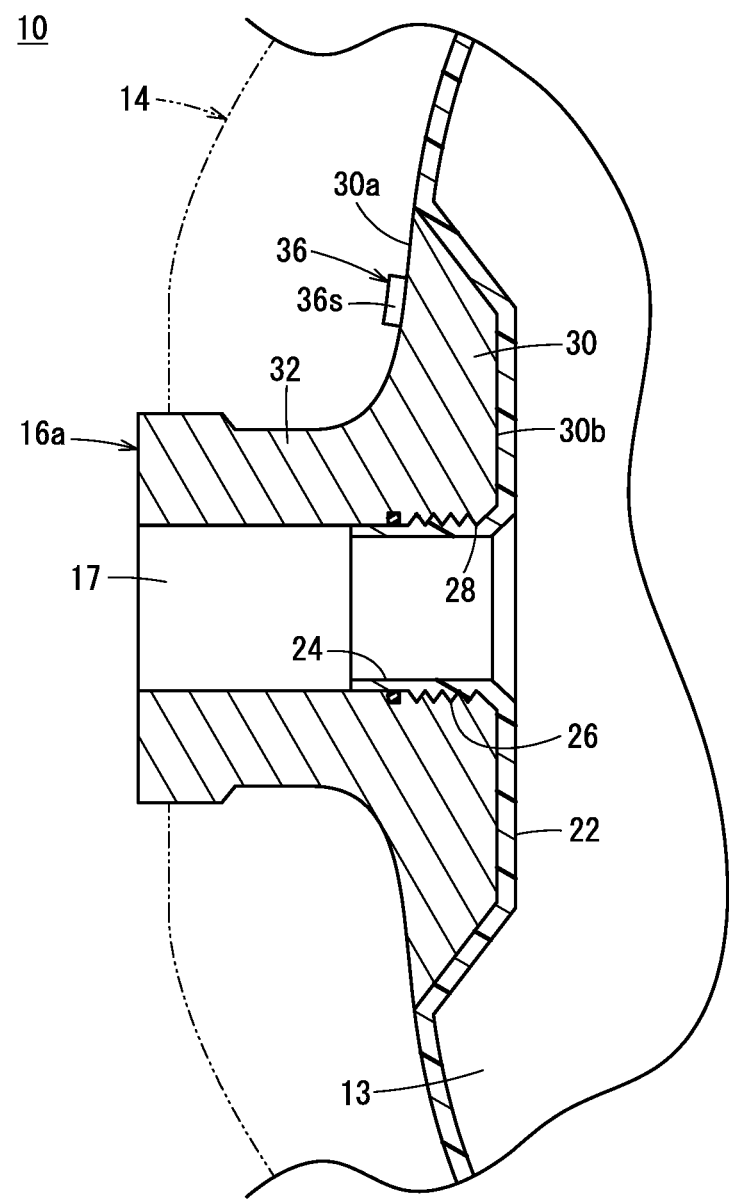
FIG. 4 is a cross-sectional view of a main part for explaining the position of a starting end of fibers (an end portion at the start of winding).

As shown in FIG. 4, a starting end 36s, which is a portion at which the fiber 36 starts to be wound with respect to the liner 12 during filament winding, is disposed overlapping the cap 16a. Specifically, the starting end 36s of the fiber 36 is disposed overlapping the flange portion 30. The starting end 36s of the fiber 36 is in contact with the front surface 30a of the flange portion 30. In FIG. 4, the reinforcing layer 14 is shown with a virtual line for helping understanding.

Hereinafter, a method of manufacturing the high-pressure tank 10 will be described.

Figure 5:
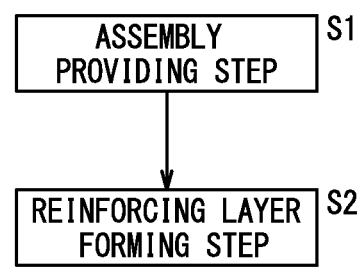
FIG. 5 is a flowchart of a method for manufacturing the high-pressure tank.

As shown in FIG. 5, the method for manufacturing the high-pressure tank 10 includes an assembly providing step S1 and a reinforcing layer forming step S2. In the assembly providing step S1, an assembly 58 (see FIG. 6A) is provided in which the cap 16a formed with the supply and discharge hole 17 that supplies and discharges fluid to and from the liner 12 is fixed to an axial end portion of the resin liner 12. In the reinforcing layer forming step S2, the fiber 36 is wound a plurality of times around the outer surface of the liner 12 of the assembly 58 (filament winding is performed), thereby forming the reinforcing layer 14 made up from a plurality of fiber layers. In the reinforcing layer forming step S2, the starting end 36s, which is the start of winding of the fibers 36, is arranged so as to overlap the cap 16a (flange portion 30).

In the reinforcing layer forming step S2, for example, the following method can be adopted.

Figure 6A:
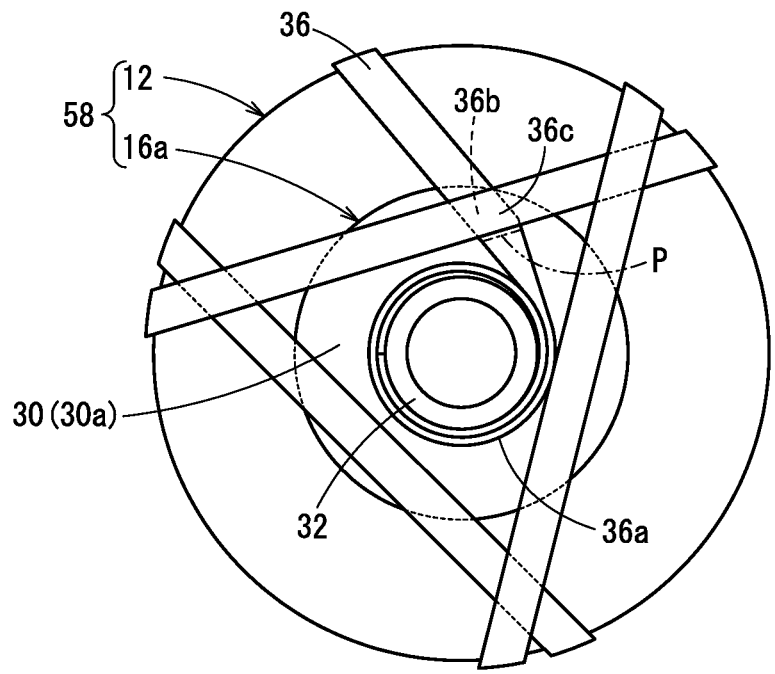
FIG. 6A illustrates one embodiment of a method for fastening fibers to a cap.

In the embodiment shown in FIG. 6A, the fiber 36 is wound around the cap 16a (tube portion 32). Next, formation of the fiber layer (low-angle helical winding) is started. In this case, the fiber 36 has a first portion 36a wound around the tube portion 32 and a second portion 36b crossing the front surface 30a of the flange portion 30 of the cap 16a of the first portion 36a. A third portion 36c that is the other portion of the fiber 36, is superimposed on the second portion 36b. Thus, the second portion 36b of the fiber 36 is fixed to the cap 16a. Next, the fiber 36 is cut at a position P located between the first portion 36a (wound portion) and the second portion 36b (overlapping portion) of the fiber 36, and the first portion 36a is removed from the cap 16a (tube portion 32). Thereafter, the fiber 36 is wound around the liner 12 (and the cap 16a) to form a plurality of fiber layers (reinforcing layer 14) (see FIG. 2).

Figure 6B:
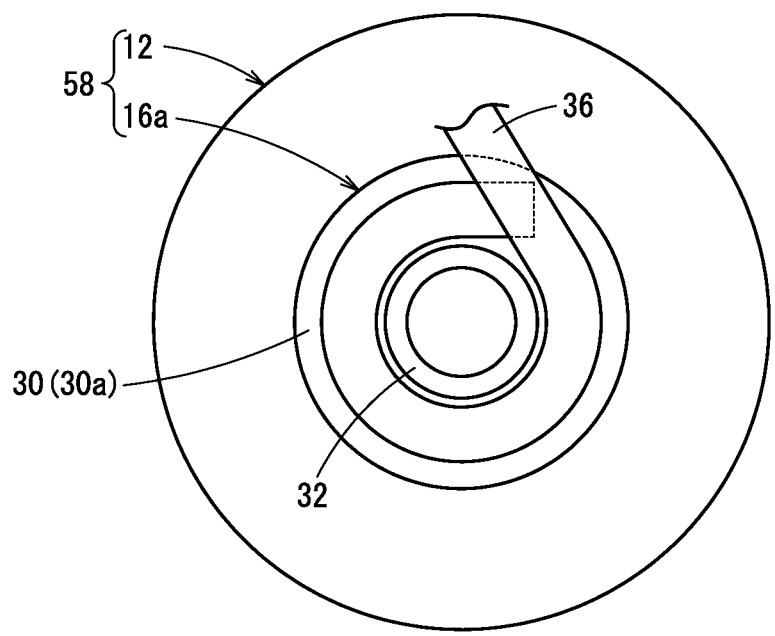
FIG. 6B illustrates another embodiment of a method for fastening fibers to a cap.

In the embodiment shown in FIG. 6B, the fiber 36 is arranged in a ring shape on the front surface 30a of the flange portion 30 of the cap 16a. Next, the overlapping portions of the fiber 36 arranged in a ring shape are bonded to each other. Thus, the fiber 36 is fixed to the cap 16a. Thereafter, the fiber 36 is wound around the liner 12 (and the cap 16a) to form a plurality of fiber layers (reinforcing layer 14) (see FIG. 2).

The high-pressure tank 10 constructed as described above has the following effects.

As shown in FIG. 4, in the case of the high-pressure tank 10, the starting end 36s as the start of winding of the fiber 36 constituting the reinforcing layer 14 is disposed so as to overlap the cap 16a. Therefore, even if cracks (damage) are formed in the fiber 36 in the innermost layer of the reinforcing layer 14 due to the level difference created by the starting end 36s, the liner 12 is not damaged. That is, even when cracks are formed in the fiber 36 in the innermost layer of the reinforcing layer 14 due to the level difference created by the starting end 36s, the cracks exist at a position overlapping the cap 16a. Therefore, the liner 12 is not pushed out by the internal pressure to enter the cracks. Therefore, it is possible to prevent the liner 12 from being damaged because of the cracks. Therefore, the life of the high-pressure tank 10 can be extended.

In the case of the high-pressure tank 10, the starting end 36s of the fiber 36 is disposed so as to overlap the flange portion 30 of the cap 16a. In this manner, the starting end 36s of the fiber 36 is disposed so as to overlap the flange portion 30. Therefore, the starting end 36s of the fiber 36 can be easily positioned with respect to the cap 16a when filament winding is performed.

In the case of the high-pressure tank 10, the flange portion 30 is disposed between the liner 12 and the reinforcing layer 14. According to this configuration, even when cracks are created in the fiber 36 in the innermost layer of the reinforcing layer 14 due to the level difference created by the starting end 36s of the fiber 36, the flange portion 30 of the cap 16a is present between the cracks and the liner 12. Therefore, the liner 12 does not contact the cracks. Therefore, it is possible to more effectively prevent the liner 12 from being broken by the cracks.

In general, when the innermost layer of the reinforcing layer is a low-angle helical layer, at the time of filament winding, hoop winding is performed for at least one turn in order to fix the starting end, which is the start of winding of the fiber, and the angle is changed up to the low-angle helical layer. In this case, it is necessary to provide a transition layer between the hoop winding at the start of winding and the low-angle helical layer. The transition layer is a layer in which the angle of the fiber gradually changes in order to connect the hoop winding portion at the start of winding and the low-angle helical layer. However, since the transition layer does not contribute to the pressure resistance strength, FRP is wasted. On the other hand, in the case of the high-pressure tank 10 according to the present embodiment, the starting end 36s of the fiber 36 is disposed so as to overlap the cap 16a. Because of this, during filament winding, the low-angle helical layer 46 can be formed without interposing a transition layer from the start of winding of the fiber 36. That is, since the transition layer can be eliminated, the high-pressure tank 10 can be reduced in weight and cost.

Figure 7:
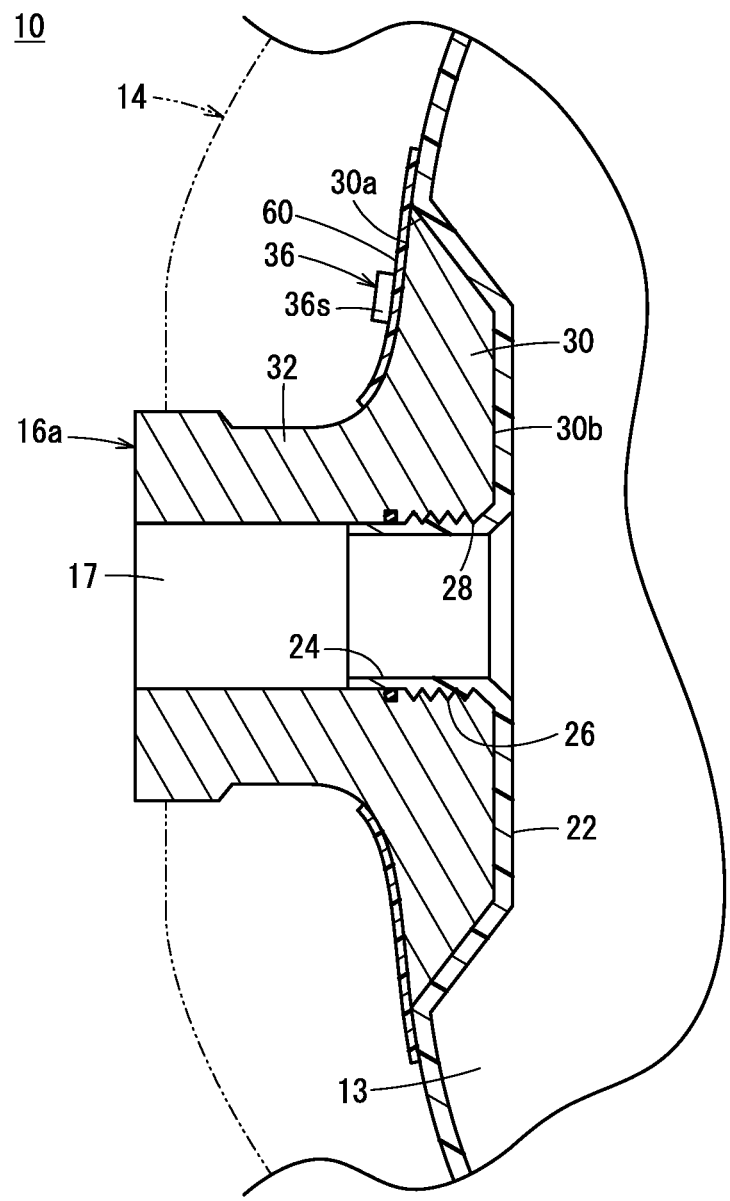
FIG. 7 is a cross-sectional view showing a main portion of a high-pressure tank according to a first modification.

In the embodiment (first modification) shown in FIG. 7, a protective member 60 is provided that extends over the cap 16a (flange portion 30) and the liner 12. The protective member 60 is, for example, a sheet-like member made of resin and formed in an annular shape along the flange portion 30. The protective member 60 is disposed between the flange portion 30 and the reinforcing layer 14.

In this case, the starting end 36s of the fiber 36 is disposed on the protective member 60 at a position overlapping the flange portion 30 when viewed along the axial direction of the liner 12. That is, the starting end 36s of the fiber 36 overlaps the flange portion 30 via the protective member 60. In this manner, even in a case where the starting end 36s of the fiber 36 is not in direct contact with the cap 16a and the starting end 36s is disposed at a position overlapping the flange portion 30 when viewed in the axial direction of the liner 12, this case is included in the configuration of "the starting end 36s as the start of winding of the fiber 36 is disposed overlapping the cap 16a".

In place of or in addition to the protective member 60, a liquid gasket may be disposed over the flange portion 30. Such a configuration is also included in the configuration of "the starting end 36s as the start of winding of the fiber 36 is disposed overlapping the cap 16a".

Figure 8:
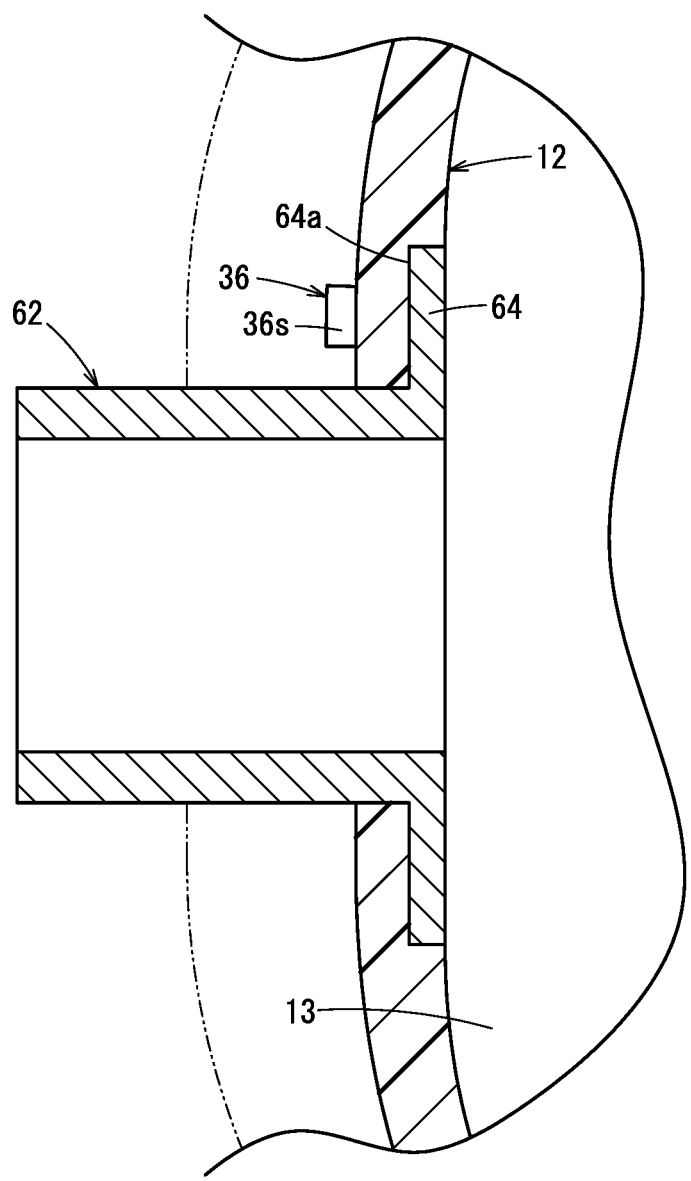
FIG. 8 is a cross-sectional view showing a main portion of a high-pressure tank according to a second modification.

In the embodiment shown in FIG. 8 (second modification), a flange portion 64 of a cap 62 is disposed inside the liner 12. In this configuration, the liner 12 is disposed on a front surface 64a of the flange portion 64. The starting end 36s of the fiber 36 is disposed on the liner 12 at a position overlapping the flange portion 30 when viewed along the axial direction of the liner 12. That is, the starting end 36s of the fiber 36 overlaps the flange portion 64 via the liner 12.

Even in this case, because the liner 12 is not pushed out into cracks by the internal pressure of the storage chamber 13 and enters the cracks, it is possible to prevent the liner 12 from being broken because of the cracks. In this manner, even in a case where the starting end 36s of the fiber 36 is not in direct contact with the cap 62 and the starting end 36s is disposed at a position overlapping the flange portion 64 when viewed from the axial direction of the liner 12, this case is included in the configuration of "the starting end 36s as the start of winding of the fiber 36 is disposed overlapping the cap 62."

The above embodiments are summarized as follows.

The above embodiment discloses a high-pressure tank (10) provided with the resin liner (12), the reinforcing layer (14) including a plurality of fiber layers formed by winding fiber (36) on the outer surface of the liner a plurality of times, and the cap (16a) fixed to the axial end of the liner and including the supply and discharge hole (17) configured to supply and discharge fluid to and from the liner, wherein the starting end (36s) as the start of winding the fiber is disposed overlapping the cap.

In the case of the high-pressure tank above, the cap includes the flange portion (30) overlapping the liner and the tube portion (32) protruding from the flange portion outward in the axial direction of the liner, and the starting end of the fiber is disposed overlapping the flange portion.

In the case of the high-pressure tank above, the flange portion is disposed between the liner and the reinforcing layer.

In the case of the high-pressure tank above, the flange portion is disposed on an inner side of the liner.

In case of the high-pressure tank above, the innermost layer of the plurality of fiber layers is a low-angle helical layer (46).

Also disclosed is the method for manufacturing the high-pressure tank (10) that includes the assembly providing step (S1) of providing an assembly (58) including the cap (16a) that is fixed to an axial end of the liner (12) made of resin wherein the cap is formed with the supply and discharge hole (17) that supplies and discharges fluid to and from the liner (12) and the reinforcing layer forming step (S2) of forming the reinforcing layer (14) from a plurality of fiber layers by winding fiber (36) a plurality of times around the outer surface of the assembly liner, wherein in the reinforcing layer forming step, the starting end (36s) as the start of winding the fiber is disposed overlapping the cap.

In the method for manufacturing the high-pressure tank, the cap includes the flange portion (30) overlapping the liner and the tube portion (32) protruding from the flange portion outward in the axial direction of the liner, and in the reinforcing layer forming step, the starting end of the fiber is disposed overlapping the flange portion.

Disclosed is the method for manufacturing the high-pressure tank, wherein the reinforcing layer forming step includes winding the fiber around the tube portion, superimposing, on the second portion (36b) of the fiber crossing the surface (30a) of the flange portion from the first portion (36a) of the fiber wound around the tube portion, the third portion (36c) of the fiber, whereby the second portion of the fiber is fixed with respect to the cap, and cutting the fiber at a position between the first portion and the second portion and removing the first portion from the cap.

In the method for manufacturing the high-pressure tank, the reinforcing layer forming step includes disposing the fiber in a ring shape on the flange portion, and bonding overlapping portions of the fiber arranged in the ring shape to each other.

The present invention is not limited to the above-described embodiments, and various configurations can be adopted therein without departing from the essence and gist of the present invention.

What is claimed is:

1. A high-pressure tank comprising:
   a liner made of resin having a cylindrical trunk and a dome portion at an end of the trunk;
   a reinforcing layer including a plurality of fiber layers formed by winding fiber a plurality of times around an outer surface of the liner; and
   a cap having a flange portion overlapping the dome portion, the cap being fixed to the dome portion of the liner, the cap including a supply and discharge hole configured to supply and discharge fluid to and from the liner; and
   a protective member having a sheet shape extending over the cap and the liner,
   wherein
   the dome portion is provided with an annular concave portion dented toward another end of the trunk,
   the flange portion is disposed between the annular concave portion and the reinforcing layer,
   a starting end as a start of winding of the fiber is disposed overlapping the flange portion of the cap inserted in the annular concave portion when viewed along an axial direction of the liner,
   the start of winding of the fiber is out of contact with the liner by the flange portion interposed between the start of winding of the fiber and the liner,
   the start of winding of the fiber is disposed on the protective member,
   the protective member is not interposed between the flange portion and the liner,
   an outer circumferential end of the flange portion is in direct contact with the liner,
   the protective member extends over the liner radially outwardly beyond a position where the outer circumferential end of the flange portion is in direct contact with the liner,
   the liner is further provided with a cylindrical convex portion protruding outward in the axial direction of the liner from a central portion of the annular concave portion, and
   the protective member is formed in an annular shape surrounding the cylindrical convex portion.

2. The high-pressure tank according to claim 1, wherein:
   the cap includes a tube portion protruding from the flange portion outward in the axial direction of the liner.

3. The high-pressure tank according to claim 1, wherein:
   an innermost layer of the plurality of fiber layers is a low-angle helical layer in which an inclination angle of the fiber with respect to the axial direction of the liner is 40° or less.

4. The high-pressure tank according to claim 1, wherein the start of winding of the fiber is in direct contact with the protective member.

5. A method for manufacturing a high-pressure tank, comprising:
   an assembly providing step of providing an assembly including a cap that is fixed to a dome portion of a liner made of resin wherein the cap has a flange portion overlapping the dome portion of the liner, the liner has a cylindrical trunk and the dome portion at an end of the trunk, and the cap is formed with a supply and discharge hole configured to supply and discharge fluid to and from the liner, and a protective member having a sheet shape extends over the cap and the liner; and
   a reinforcing layer forming step of forming a reinforcing layer including a plurality of fiber layers by winding fiber a plurality of times around an outer surface of the liner of the assembly,
   wherein:
   the dome portion is provided with an annular concave portion dented toward another end of the trunk,
   the flange portion of the cap is inserted in the annular concave portion,
   the protective member having the sheet shape is extended over the cap and the liner,
   in the reinforcing layer forming step, a starting end as a start of winding of the fiber is disposed overlapping the flange portion of the cap when viewed along an axial direction of the liner, and the flange portion is disposed between the annular concave portion and the reinforcing layer, the start of winding of the fiber is out of contact with the liner by the flange portion and the protective member interposed between the start of winding of the fiber and the liner, the start of winding of the fiber is disposed on the protective member, the protective member is not interposed between the flange portion and the liner, an outer circumferential end of the flange portion is in direct contact with the liner, the protective member extends over the liner radially outwardly beyond a position where the outer circumferential end of the flange portion is in direct contact with the liner, the liner is further provided with a cylindrical convex portion protruding outward in the axial direction of the liner from a central portion of the annular concave portion, and the protective member is formed in an annular shape surrounding the cylindrical convex portion.

6. The method according to claim 5, wherein:
the cap includes a tube portion protruding from the flange portion outward in an axial direction of the liner.

7. The method according to claim 6, wherein
the reinforcing layer forming step includes:
winding the fiber around the tube portion;
superimposing, on a second portion of the fiber crossing a surface of the flange portion from a first portion of the fiber wound around the tube portion, a third portion of the fiber, whereby the second portion of the fiber is fixed with respect to the cap; and
cutting the fiber at a position between the first portion and the second portion and removing the first portion from the cap.

8. The method according to claim 6, wherein
the reinforcing layer forming step includes:
disposing the fiber in a ring shape on the flange portion; and
bonding overlapping portions of the fiber arranged in the ring shape to each other.

* * * * *